(12) United States Patent
Cadiou et al.

(10) Patent No.: US 8,793,395 B2
(45) Date of Patent: Jul. 29, 2014

(54) METHOD OF CONFIGURING PARAMETERS FOR MANAGING DATA PACKETS OF A DATA STREAM

(75) Inventors: Jean-François Cadiou, Trebeurden (FR); Jean-Michel Bonnamy, Pleumeur Bodou (FR); Isabelle Hamchaoui, Tregastel (FR); René Chaplain, Lannion (FR)

(73) Assignee: France Telecom, Paris (FR)

( * ) Notice: Subject to any disclaimer, the term of this patent is extended or adjusted under 35 U.S.C. 154(b) by 475 days.

(21) Appl. No.: 13/125,714

(22) PCT Filed: Oct. 22, 2009

(86) PCT No.: PCT/FR2009/052018
§ 371 (c)(1),
(2), (4) Date: Apr. 22, 2011

(87) PCT Pub. No.: WO2010/046598
PCT Pub. Date: Apr. 29, 2010

(65) Prior Publication Data
US 2011/0202622 A1    Aug. 18, 2011

(30) Foreign Application Priority Data

Oct. 23, 2008 (FR) ..................................... 08 57195
Apr. 30, 2009 (FR) ..................................... 09 52915

(51) Int. Cl.
G06F 15/16 (2006.01)
H04L 12/24 (2006.01)
H04L 29/06 (2006.01)

(52) U.S. Cl.
CPC ............. *H04L 41/0806* (2013.01); *H04L 65/80* (2013.01)
USPC ............................ 709/236; 709/230; 709/249

(58) Field of Classification Search
USPC ........................................ 709/230, 236, 249
See application file for complete search history.

(56) References Cited

U.S. PATENT DOCUMENTS

| 6,996,102 | B2 * | 2/2006 | Pegrum et al. ................. 370/390 |
| 7,050,396 | B1 * | 5/2006 | Cohen et al. ................... 709/228 |
| 7,697,422 | B1 * | 4/2010 | Arad et al. ..................... 370/389 |
| 7,698,457 | B2 * | 4/2010 | Ghetie et al. .................. 709/238 |

(Continued)

OTHER PUBLICATIONS

Atarashi Communications Research Laboratory F Baker Cisco Systems R: "Reflexive DSCP Policy; draft-atarashi-dscp-policy-00.txt" IETF Standard-Working-Draft, Internet Enfineering Task Force, IETF, CH, Oct. 1, 2010, XP015010404 ISSN: 0000-0004.

(Continued)

*Primary Examiner* — Patrice Winder
(74) *Attorney, Agent, or Firm* — David D. Brush; Westman, Champlin & Koehler, P.A.

(57) ABSTRACT

A method and apparatus are provided for configuring management parameter values of data messages of a data stream. The method includes a first step of sending from a first communications network to a second communications network a first message of the data stream including a first data message management parameter value and a second step of sending from the second network to the first network a second message of the data stream including a second data message management parameter value. The method further includes a step of selecting from the first and second management parameter values a management parameter value to be applied to all the data messages of the data stream.

6 Claims, 3 Drawing Sheets

(56) References Cited

U.S. PATENT DOCUMENTS 7,843,843 B1 * 11/2010 Papp et al. .................... 709/224
2008/0056153 A1 * 3/2008 Liu ................................ 370/392
2008/0144502 A1 6/2008 Jackowski et al.

OTHER PUBLICATIONS

Written Opinion dated Jul. 15, 2010 from International Application No. PCT/FR2009/052018, filed Oct. 22, 2009.

International Search Report dated Jul. 15, 2010 from International Application No. PCT/FR2009/052018, filed Oct. 22, 2009.

English Translation of the Written Opinion dated May 31, 2011 for corresponding International Application No. PCT/FR2009/052018, filed Oct. 22, 2009.

James Polk, "Configuring the Differentiated Services Codepoint of Session Description Protocol Established Media Streams: draft-polk-mmusic-dscp-attribute-01.tex" IETF Standard-Working-Draft. Internet Engineering Task Force, IETF, CH. No. 1, 5 mars 2007 (Mar. 5, 2007), XP015050313 ISSN: 0000-0004.

* cited by examiner

METHOD OF CONFIGURING PARAMETERS FOR MANAGING DATA PACKETS OF A DATA STREAM

CROSS-REFERENCE TO RELATED APPLICATIONS

This application is a Section 371 National Stage Application of International Application No. PCT/FR2009/052018, filed Oct. 22, 2009, and published as WO2010/046598 on Apr. 29, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a technique for managing data messages of a data stream transmitted between two distinct communications networks.

BACKGROUND OF THE DISCLOSURE

With the growth of telecommunications, an increasing number of terminal equipments are being called upon to exchange data message streams. These terminals often belong to distinct communications networks. In each of these communications networks, the network resource manager, for example a telecommunications operator, defines management parameter values to be applied to the different data message streams transmitted across the network. Each of these data message streams corresponds to a service such as an Internet service, a Voice over IP (VoIP) service, or audio-visual services such as IPTV services, for example. These management parameter values are the class of service or Differentiated Services Code Point (DSCP), and the priority to be given to the data message as a function of the class of service, for example. The management parameter values are contained in header fields of the data messages.

The resource manager of each of the networks passed through checks that the data streams receive the benefit of the resources necessary to provide the corresponding service. Accordingly, for the same data stream, and thus the same service, depending on whether the data messages are sent from a first network to a second network or vice-versa, different management parameter values are applied to them because the managers are different.

Figure 1:
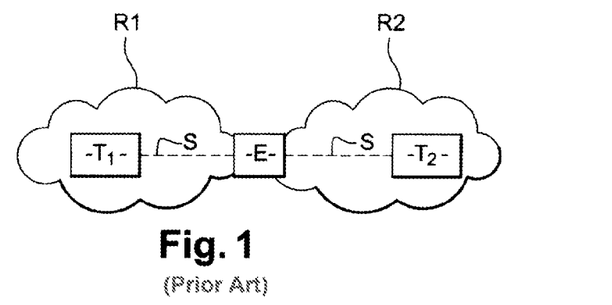
FIG. 1 represents a data stream exchanged between two terminals of two distinct communications networks in the prior art.

Referring to FIG. 1, a data stream S represented in dashed line in the figure is transmitted between a first terminal $T_1$ and an equipment $T_2$. The terminal $T_1$ belongs to a first communications network R1, for example a home or business local area network, and the equipment $T_2$ belongs to a communications network R2 of the wide area network (WAN) type managed by a telecommunications operator. An equipment E provides an interface between the local area network R1 and the network R2.

If the first network R1 is a home local area network, the equipment E is a home gateway. In this situation the equipment manages the resources within the local area network R1 and the resources to be assigned to the data streams sent from the network R1 to the network R2. As a function of the class of service, the equipment E applies a priority to the data messages sent from the local area network R1 to the network R2 in the event of congestion in order to implement different processing policies for the data streams and thereby to ensure a satisfactory quality of service. The management parameter values are introduced into the headers of the data messages by the terminal $T_1$ itself. However, since the terminal $T_1$ is not necessarily controlled by the operator managing the network R2, the values of the management parameter values contained in the headers of the data messages sent by the terminal $T_1$ are not reliable for the network R2. It is possible for a terminal of the local area network R1 to introduce into the headers of the data messages erroneous or malicious management parameter values. Such erroneous or malicious marking of the data messages leads to incorrect processing of the data messages with the consequences of the appearance of congestion in the different networks and degraded quality of service for all users.

To remove that drawback, a first solution uses the IP (Internet Protocol) address of the equipment $T_2$, which is reliable because it is assigned by the telecommunications operator managing the network R2, in order to have access to the class of service to be assigned to the data messages sent by the terminal $T_1$. However, if that IP address is modified in the event of modifying the architecture or the addressing scheme of the network, the information relating to the class of service is lost. Moreover, the same terminal $T_1$ may wish to use in succession a plurality of different services and therefore a plurality of different classes of service. Determining the class of service from the address of the terminal $T_1$ is thus not always a satisfactory solution.

There is therefore a need for a technique that is free of such drawbacks and that makes it possible, for each data message sent to another network by an unreliable communications network to determine QoS management parameter values to be applied to these data messages, where an "unreliable" network is one that is not managed by a telecommunications operator, such as a business local area network or a home network.

SUMMARY

An embodiment of the invention responds to this need by providing a method of configuring management parameter values of data messages of a data stream, the method including:

a first step of sending from a first communications network to a second communications network a first message of the data stream including a first data message management parameter value; and a second step of sending from the second network to the first network a second message of the data stream including a second data message management parameter value.

This method further includes a step of selecting from the first and second management parameter values the management parameter value to be applied to all the data messages of the data stream.

Such a solution ensures that a relationship of trust is established between the different terminals between which the data stream is set up at the same time as being transparent to the different modifications that may arise in one of the two networks.

Throughout the present document, the expression "data message" refers to a data packet or a set of data packets of the data stream.

By using a single management parameter value and applying it to all the data packets of a message of the data stream, it is possible to take into account modifications occurring in the network or networks without interrupting the service and without having to modify an equipment disposed at the frontier of the two networks. For example, if a new terminal of the first network exchanges a data stream with a terminal of the second network, it is not necessary to modify the equipment disposed at the frontier of the two networks or to interrupt the service to set up a relationship of trust between the two terminals. It suffices to determine the management parameter value to be used for this data stream and to apply it to all the data packets of this stream.

If the first network is a home local area network and the second network is a WAN, preferably managed by a telecommunications operator, the management parameter value to be applied is the second management parameter value coming from the WAN. Since the WAN is managed by the telecommunications operator, the management parameter value coming from that network is reliable. Thus data packets sent from the first network to the second network inherit the management parameter value of data packets sent from the second network to the first network.

According to one feature of the configuration method of an embodiment of the invention, the first and second management parameter values are contained in a header field of the data messages of the data stream.

This field corresponds to the DSCP field defined in the IETF (Internet Engineering Task Force) document (Request For Comments) RFC 2474, for example. This kind of field includes information relating to the nature of the stream to which a data message belongs and to how such a stream must be treated by the different equipments through which the data stream passes. Consequently, it is not necessary to modify the headers of the data packets of the transmitted message.

According to one feature of the configuration method of an embodiment of the invention, before the step of selecting the management parameter value to be applied, a predetermined management parameter value is applied to the data messages of the data stream.

Applying a default management parameter value to the data packets of the message when the management parameter value to be applied has not been determined limits the risk of congestion in the network linked to inappropriate processing of the data packets. Thus each user is guaranteed access to the resources of the network.

According to one feature of the configuration method of an embodiment of the invention, it includes, before the step of selecting the management parameter value to be applied, a step of comparing a parameter ECN (Explicit Congestion Notification) included in a header field of the data messages of the data stream with a value of said parameter ECN previously associated with the data stream.

By comparing the value of the parameter ECN contained in a header field of the data packets of the message with a value of said parameter previously associated with the data stream it is possible to determine whether the management parameter value contained in the header field of the data packets has been updated. The parameter ECN is defined in the IETF document RFC 3168.

This parameter finds a particularly advantageous application if the data stream is sent via a secure tunnel such as an IPsec tunnel. In such a situation, the secure tunnel is perceived by the equipment disposed at the frontier between the two networks as a data stream. The parameter ECN then makes it possible to distinguish a plurality of distinct data streams transmitted via the secure tunnel, thus ensuring that the appropriate management parameter value is associated with each data stream.

An embodiment of the invention also relates to a device for configuring management parameter values of data messages of a data stream, the device including:

first means for sending from a first communications network to a second communications network a first message of the data stream including a first data message management parameter value; and second means for sending from the second network to the first network a second message of the data stream including a second data message management parameter value.

Such a device further includes means for selecting from the first and second management parameter values the management parameter value to be applied to all the data messages of the data stream.

An embodiment of the invention further relates to equipment providing an interface between first and second communications networks, including a device for configuring management parameter values of data messages belong to a data stream, including:

first means for sending from the first communications network to the second communications network a first message of the data stream including a first data message management parameter value;

second means for sending from the second network to the first network a second message of the data stream including a second data message management parameter value; and means for selecting from the first and second management parameter values the management parameter value to be applied to all the data messages of the data stream.

An equipment of this kind may be a home or business gateway, a digital subscriber line multiplexer (DSLAM), a router, an optical line termination (OLT) or a multiservice access node.

An embodiment of the invention further relates to a computer program including program code instructions for executing the steps of the configuration method of an embodiment of the invention when the program is executed by a processor.

An embodiment of the invention finally relates to a storage medium readable by a configuration device and in which the computer program of the invention is stored.

BRIEF DESCRIPTION OF THE DRAWINGS

Other features and advantages become apparent on reading the description of embodiments of the invention given with reference to the drawings, in which.

DETAILED DESCRIPTION OF ILLUSTRATIVE EMBODIMENTS

Figure 2:
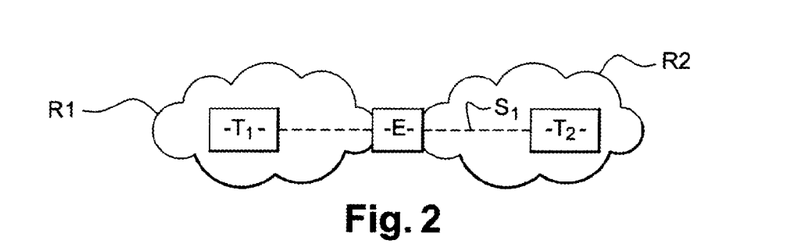
FIG. 2 represents a data stream exchanged between a terminal of a first communications network and an equipment of a second communications network in accordance with an embodiment of the present invention.

Referring to FIG. 2, a first terminal $T_1$ belongs to a first communications network R1. An equipment E is placed at the edge of the network R1 and provides the interface between the network R1 and a second communications network R2. The communications network R2 includes a network equipment $T_2$, for example.

The network R1 is a home or business local area network, for example. In this situation the terminal $T_1$ may be a personal computer (PC), a video decoder (Set Top Box), an IP telephone, etc. The network R2 is for example a WAN managed by a telecommunications operator. In this situation the equipment $T_2$ may be a server providing services such as an Internet connection, IP television, IP video, etc.

In an embodiment of this kind, the interface equipment E is then a home or business gateway.

If a user wishes to obtain the benefit of a service on the terminal $T_1$, the terminal must set up a data stream with the equipment $T_2$ of the network R2 providing the required service.

The terminal $T_1$ and the equipment $T_2$ then exchange messages of the data stream. Such messages include one or more data packets of the stream. In the remainder of the description, for simplicity, there is described an example of using an embodiment of the invention at the level of the data packets constituting the messages. The reader can easily extend this teaching to the data messages, each of which comprises one or more data packets.

A data stream S1 represented in dashed line in FIG. 1, is exchanged between the terminal $T_1$ of the network R1 and the equipment $T_2$ of the network R2 via the intermediate equipment E. A data stream of this kind is identified, for example, by means of the IP address of the terminal $T_1$, a UDP (User Datagram Protocol) port of the equipment $T_2$, called the source UDP port, and a UDP port of the terminal $T_1$, called the destination UDP port. In one particular embodiment of the invention, the data stream is identified, for example, by the IP address of the terminal $T_1$, a TCP (Transmission Control Protocol) port of the equipment $T_2$, called the source TCP port, and a TCP port of the terminal $T_1$, called the destination TCP port.

The data packets of the data stream S1 also include management parameter values such as the DSCP class of service and the priority to be assigned to the data packets as a function of the class of service when they are processed by the different network equipments through which the data stream S1 is transmitted, and a parameter ECN (Explicit Congestion Notification) as defined in the IETF document RFC 3168. The DSCP level of service is defined in the document RFC 2474.

This information (management parameter value, class of service, parameter ECN, etc.) is common to all the data packets of the same message. Thus the management parameter value included in the header of a data packet is also the management parameter value of the message containing the data packet. The same applies to the other parameters contained in the header of a data packet. Thus the parameter ECN contained in the header of the data packet is also the parameter ECN of the message containing the data packet.

In this first embodiment of the invention, the parameter ECN is not used. The value of the parameter ECN remains unchanged while using the configuration method. The value of the parameter ECN is 0, for example.

The management parameter values of the data packets are specific to each type of service offered or requested, and thus to each data stream, and are usually determined by the communications network manager. Thus in each of the communications networks R1, R2 the network resource manager, for example a telecommunications operator for the network R2, defines management parameter values to be applied to the different streams of data packets transmitted across this network. The management parameter values and the parameter ECN are respectively contained in the fields DSCP and ECN of the header fields of the data packets.

The network R1 being a home local area network, the different terminals supply management parameter values to be applied to the data packets (and thus to the data messages) in transit in the network to the interface equipment E. The equipment E ensures that the data streams have the benefit of the resources necessary to provide the corresponding service.

Similarly, the management parameter values to be applied to the data packets (and thus to the data messages) in transit in the network R2 are determined by the telecommunications operator managing the network R2. The operator ensures that the data streams have the benefit of the resources necessary to provide the corresponding service.

Accordingly, for the same data stream, such as the data stream S1, and therefore the same service, depending on whether the data packets are transmitted from the first network R1 to the second network R2 or vice-versa, different management parameter values are applied to them because the managers of the networks R1 and R2 are different.

The management parameter values supplied by the terminals of the network R1 are not defined by the telecommunications operator managing the network R2 and are considered unreliable. It is then necessary to apply a reliable management parameter value to the data packets coming from the network R1 and going to the network R2.

Figure 3:
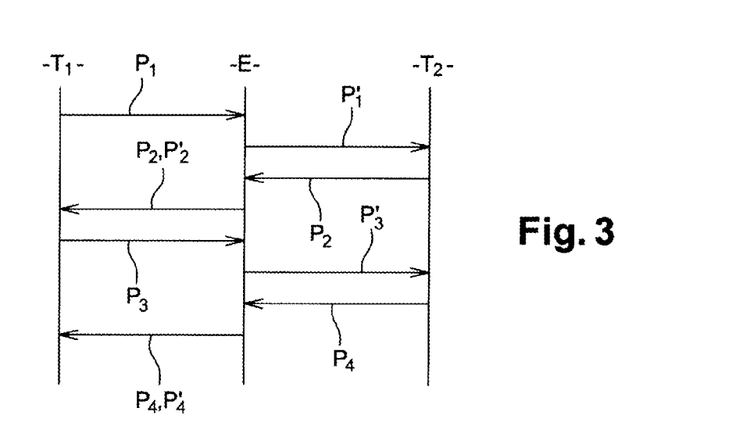
FIG. 3 represents a timing diagram of the exchanges of data packets between a terminal of the first communications network and the equipment of the second communications network during use of the configuration method of an embodiment of the invention.

FIG. 3 represents the different exchanges of data packets between the first terminal $T_1$, the interface equipment E, and the equipment $T_2$ when using the configuration method of an embodiment of the invention.

If a user wishes to have the benefit of a service on the terminal $T_1$, the terminal must set up a data stream S1 with the equipment $T_2$ of the network R2 providing the required service.

The terminal $T_1$ sends the interface equipment E a first data packet $P_1$ of the data stream S1. This kind of data packet $P_1$ includes a management parameter value Param1 and a parameter ECN, the value of which is 0, for example, to be applied to all the data packets of the data stream S1 sent by the terminal $T_1$ to the equipment $T_2$.

On reception of this data packet $P_1$ the interface equipment E may, in one particular embodiment of the invention, replace the management parameter value Param1 contained in the header of the data packet sent by the terminal $T_1$ with a predetermined management parameter value ParamBE.

The interface equipment E then sends a second data packet $P_1'$ of the data stream S1 in which the management parameter value is ParamBE and no longer Param1. By replacing the management parameter value contained in the data packet $P_1$ with the management parameter value ParamBE, it is certain that data packets sent by the terminal $T_1$ will have a processing policy applied to them by the equipments of the network R2, which processing policy ensures a satisfactory quality of service.

On reception of this data packet $P_1'$, the equipment $T_2$ sends the terminal $T_1$ a third data packet $P_2$ of the data stream S1. A data packet $P_2$ of this kind includes a management parameter value Param2 and a parameter ECN, the value of which is also 0, to be applied to all the data packets of the data stream S1 sent by the terminal $T_1$ to the equipment $T_2$.

The data packet $P_2$ is intercepted by the interface equipment E, which extracts the management parameter value Param2 and the parameter ECN in order to store them with other information contained in the set-up data packet $P_2$, such as identifiers of the terminal $T_1$ and the equipment $T_2$ or the data stream S1 such as the IP address of the terminal $T_1$, a source UDP port, and a destination UDP port.

On reception of this data packet $P_2$, the interface equipment E may, in one particular embodiment of the invention, replace the management parameter value Param2 contained in the header of the data packets sent by the equipment $T_2$ with the management parameter value Param1 used in the network R1. The interface equipment E then sends a second data packet $P_2'$ of the data stream S1 in which the management parameter value is Param1 and no longer Param2. The value of the parameter ECN remains unchanged and is still 0. In one particular embodiment of the invention, the interface equipment E may replace the value of the parameter ECN with a default value.

In another particular embodiment of the invention, the management parameter value Param2 contained in the header of the data packets sent by the equipment $T_2$ may be replaced by a new management parameter value Param3. This management parameter value Param3 is stored in the table T of the interface equipment E. In this embodiment, the value of the parameter ECN remains unchanged.

The data packet $P_2$, $P_2'$ is then sent to the terminal $T_1$.

Once the interface equipment E has been configured, data packets $P_3$ of the data stream S1 sent by the terminal $T_1$ are intercepted by the interface equipment E.

The interface equipment E identifies the data stream to which the data packets $P_3$ belong by means of identification information for the terminal $T_1$ and the equipment $T_2$ or from information identifying the data stream S1 stored in it, such as the IP address of the terminal $T_1$, a source UDP port, and a destination UDP port. Using this information, it determines the management parameter value to be applied to the data packets $P_3$. Once the management parameter value to be applied has been determined, the interface equipment E replaces the management parameter value contained in the header of the data packets $P_1$, namely Param1, with the management parameter value stored when configuring the interface equipment E, namely Param2.

The interface equipment E then sends data packets $P_3'$ to the equipment $T_2$. These data packets $P_3'$ include in the header a management parameter value Param2. Thus data packets sent by the terminal $T_1$, during processing by the interface equipment E, inherit the management parameter value Param2 determined by the manager of the network R2.

Figure 4:
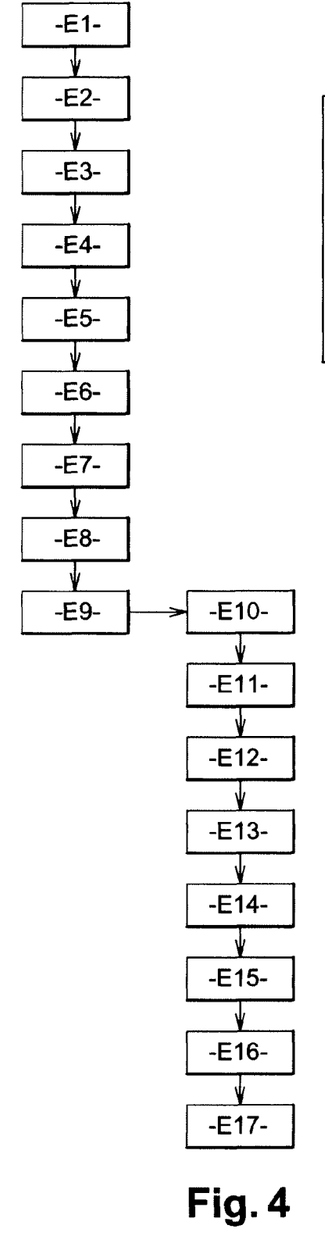
FIG. 4 represents the steps of the configuration method of a first embodiment of the invention.

FIG. 4 represents the different steps of the configuration method of an embodiment of the invention.

During a step E1, the terminal $T_1$ of the network R1 sends a first data packet $P_1$ of a data stream S1. The data packet $P_1$ contains a management parameter value Param1 for data packets to be sent in the data stream S1 and a parameter ECN the value of which is 0, for example.

During a step E2, the data packet $P_1$ is received by the interface equipment E marking the frontier between the network R1 and the network R2.

The interface equipment E replaces the management Param1 contained in the data packet $P_1$ with a default parameter ParamBE during a step E3.

During a step E4, the interface equipment sends a data packet $P_1'$ of the data stream S1 to the equipment $T_2$ of the network R2. This kind of data packet $P_1'$ differs from the data packet $P_1$ in that the management parameter value it contains is ParamBE.

During a step E5, the equipment $T_2$ receives the data packet $P_1'$ and in response sends a second data packet of the data stream S1 during a step E6. The data packet $P_2$ contains a management parameter value Param2 for data packets of the data stream S1 and a parameter ECN the value of which is 0.

During a step E7, the data packet $P_2$ is received by the interface equipment E. The interface equipment E stores the management parameter value Param2 and the parameter ECN contained in the data packet $P_2$ in a table T. Information identifying the data stream S1 such as the IP address of the terminal $T_1$, a source UDP port, and a destination UDP port, is also stored in this table T.

The interface equipment E replaces the management parameter value Param2 contained in the data packet $P_2$ with the value Param1 or Param3, depending on the embodiment of the invention used, during a step E8. During a step E9, the interface equipment sends a data packet $P_2'$ of the data stream S1 to the terminal $T_1$ of the network R1. This kind of data packet $P_2'$ differs from the data packet $P_2$ in that the management parameter value it contains is Param1 or Param3.

During a step E10, the terminal $T_1$ sends data packets $P_3$ to the equipment $T_2$. These packets are intercepted by the interface equipment E.

During a step E11, the interface equipment E identifies the data stream to which the data packets $P_3$ belong in order to determine the value of the management parameter value to be applied to the data packets $P_3$. This identification is effected by means of the information contained in the table T and information contained in the headers of the data packets $P_3$. Once the value of the management parameter value to be applied has been determined, the interface equipment E replaces the management parameter value contained in the headers of the data packets $P_3$, namely Param1, with the management parameter value stored during configuration of the interface equipment E, namely Param2, during a step E12.

The interface equipment E then sends data packets $P_3'$ to the equipment $T_2$ during a step E13.

During a step E14, the equipment $T_2$ sends data packets $P_4$ to the terminal $T_1$. These packets are intercepted by the interface equipment E.

During a step E15, the interface equipment E indentifies the data stream to which the data packets $P_4$ belong in order to determine the management parameter value to be applied to the data packets $P_4$. This identification is effected by means of the information contained in the table T and information contained in the headers of the data packets $P_4$. Once the management parameter value to be applied has been determined, the interface equipment E replaces the management parameter value contained in the headers of the data packets $P_4$, namely Param2, with the management parameter value stored during configuration of the interface equipment E, namely Param1 or Param3, during a step E16.

The interface equipment E then sends data packets $P_4$, $P_4'$ to the terminal $T_1$ during a step E17.

The configuration method of an embodiment of the invention also makes it simple to take into account any modification of the management policy of the network R2, such as a modification of the management parameter value to be applied to the data packets of the data stream S1.

Because the interface equipment E intercepts the data packets sent from the equipment $T_2$ to the terminal $T_1$, it is possible to update the table T by replacing the old management parameter value stored in the table T for a particular data stream with a new parameter to be applied to the data packets sent in that data stream.

The data streams relating to certain services such as Voice over IP, a file transfer service or the use of convergent telephones based on technologies such as IWLAN (Interworking Wireless LAN), UMA (Unlicensed Mobile Access) or IPsec (Internet Protocol Security) require secure transmission. To make transmission secure, the data streams relating to these services are rendered comprehensible only by the final destination, here the terminal $T_1$, for example by applying an encryption algorithm.

This kind of data stream is transmitted via an IPsec tunnel. The IPsec technology is based on a set of protocols using algorithms for transporting secure data streams over an IP network. An IPsec tunnel is set up by means of protocols that ensure the integrity and confidentiality of transmission. One example of such a protocol is the ESP (Encapsulating Security Payload) protocol defined by the IETF document RFC 2406.

The expression IPsec tunnel is used to symbolize the fact that data transmitted between first and second network equipments, for example between the equipment $T_2$ and the terminal $T_1$, constituting the ends of an IPsec tunnel is encrypted and thus normally incomprehensible to any network equipment situated between the two ends of the IPsec tunnel, such as the intermediate equipment E.

Figure 6:
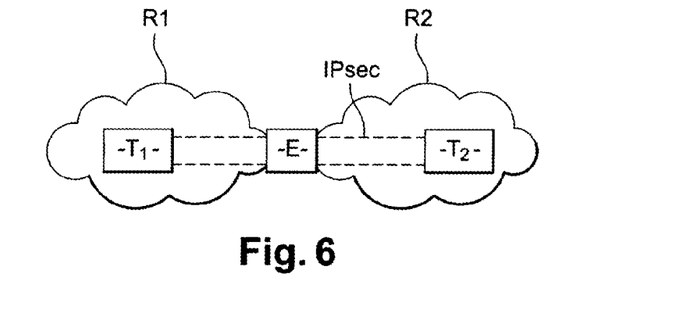
FIG. 6 represents an encrypted tunnel set up in accordance with an embodiment of the present invention between a terminal of a first communications network and an equipment of a second communications network.

An IPsec tunnel, represented in dashed line in FIG. 6, is set up between the terminal $T_1$ of the network R1 and the equipment $T_2$ of the network R2 via the intermediate equipment E. An IPsec tunnel of this kind is identified, for example, by the IP address of the terminal $T_1$, a UDP port of the equipment $T_2$, called the source UDP port, and a UDP port of the terminal $T_1$, called the destination UDP port. From the point of view of the intermediate equipment E, this IPsec tunnel is perceived as a data stream, because the data enabling the intermediate equipment E to identify it is of the same kind as the data enabling identification of a standard data stream, i.e. one that is not transmitted through an IPsec tunnel.

In an IPsec tunnel of this kind, a plurality of encrypted data streams each relating to a particular service are exchanged between the terminal $T_1$ and the equipment $T_2$.

The data packets of each data stream exchanged via the IPsec tunnel include management parameter values such as the DSCP class of service and a parameter ECN, for example. The data packets relating to the different encrypted data streams exchanged via the IPsec tunnel are encapsulated in data packets of the IPsec tunnel. The data packets of the IPsec tunnel include a header containing a copy of the management parameter values and the parameter ECN relating to the different encrypted data streams.

In this second embodiment of the invention, the Parameter ECN is of particular interest. In such an embodiment, the Parameter ECN distinguishes between the different data streams transmitted by the same IPsec tunnel at the level of the intermediate equipment E.

The data packet management parameter values are specific to each type of service offered or requested and are usually determined by the manager of the communications network. The management parameter values and the parameter ECN are respectively included in the fields DSCP and ECN of the header fields of the data packets.

The network R1 being a home local area network, the different terminals supply management parameter values to be applied to the data packets in transit in the network to the interface equipment E. The equipment E verifies that the data streams have the benefit of the resources necessary to provide the corresponding service.

Similarly, the management parameter values to be applied to the data packets in transit in the network R2 are determined by the telecommunications operator managing the network R2, which verifies that the data streams have the benefit of the resources necessary to provide the corresponding service.

However, when the different data streams are transmitted via an IPsec tunnel, from the point of view of the intermediate equipment E it is just as if a single data stream were exchanged between the terminal $T_1$ and the equipment $T_2$, i.e. the IPsec tunnel. The intermediate equipment is then unable to process individually the different data streams exchanged via the IPsec tunnel.

Thus if two distinct data streams are exchanged via the same IPsec tunnel, the intermediate equipment E cannot determine which management parameter values to apply to the received data packets. More generally, this is true for all data streams encapsulated in another data stream that is encrypted.

Figure 7:
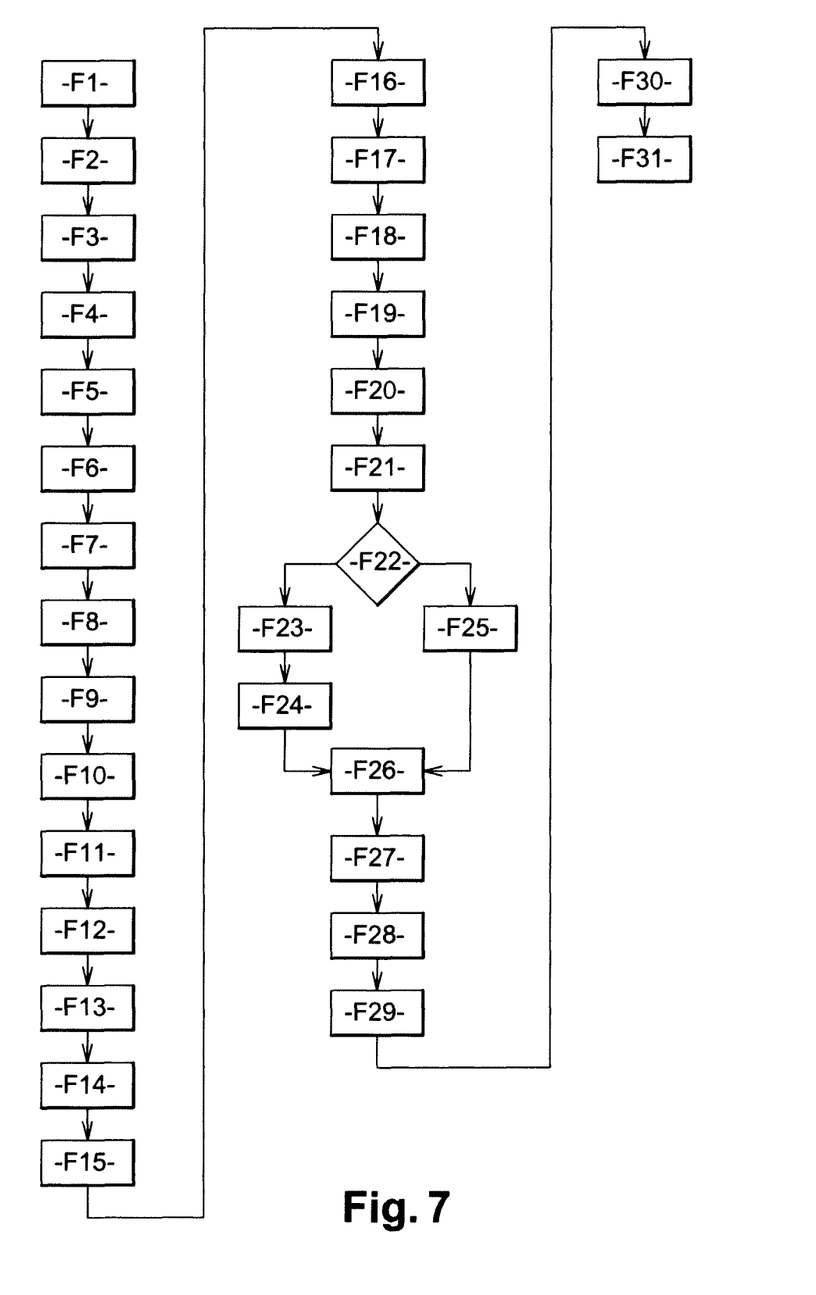
FIG. 7 represents the steps of the configuration method of a second embodiment of the invention.

FIG. 7 represents the different steps of the configuration method in the second embodiment of the invention.

A user wishing to obtain the benefit of a first service on the terminal $T_1$ requiring the setting up of an IPsec tunnel must set up a data stream G1 with the equipment $T_2$ of the network R2 providing the requested service.

The terminal $T_1$ sends the interface equipment E a first data packet $M_1$ of an encrypted data stream G1 during a step F1. A data packet $M_1$ of this kind includes a management parameter value Param1 and a parameter ECN, the value of which is 0, to be applied to all the data packets of the encrypted data stream G1 sent by the terminal $T_1$ to the equipment $T_2$ via the IPsec tunnel. This data packet $M_1$ is encapsulated in a data packet $m_1$ of the IPsec tunnel and including in its header the management parameter value Param1 and the parameter ECN.

On reception of this data packet $m_1$, during a step F2, the interface equipment E may, in one particular embodiment of the invention, replace the management parameter value Param1 included in the header of the data packets sent by the terminal $T_1$ with a predetermined management parameter value ParamBE. In this embodiment, the value of the parameter ECN remains unchanged and is still 0. In one particular embodiment of the invention, the interface equipment E may replace the value of the parameter ECN with a default value.

The interface equipment E then sends during a step F3 a second data packet $m_1'$ of the IPsec tunnel in which the management parameter value is ParamBE and no longer Param1. Replacing the management parameter value included in the data packet $m_1$ with the management parameter value ParamBE ensures that the data packets $M_1$ sent by the terminal $T_1$ and encapsulated in the data packet $m_1$ will have a processing policy applied to them by the equipments of the network R2, which processing policy ensures a satisfactory quality of service.

On reception of this data packet $m_1'$, during a step F4, the equipment $T_2$ sends the terminal $T_1$, during a step F5, a third data packet $M_2$ of the encrypted data stream G1. A data packet $M_2$ of this kind includes a management parameter value Param2 and a parameter ECN, the value of which is 1, for example, to be applied to all the data packets of the encrypted data stream G1 sent by the terminal $T_1$ to the equipment $T_2$ via the IPsec tunnel. This data packet $M_2$ is encapsulated in a data packet $m_2$ of the IPsec tunnel and including in its header the management parameter value Param2 and the parameter ECN.

The data packet $m_2$ is intercepted, during a step F6, by the interface equipment E which, during a step F7, extracts the management parameter value Param2 and the parameter ECN. These two parameters are accessible to the intermediate equipment even though it does not constitute one end of the IPsec tunnel. These two parameters are stored in a table T with other information contained in the setting-up data packet $m_2$, such as the IP address of the terminal $T_1$, the source UDP port, and the destination UDP port. Thus the parameters Param2 and ECN are stored, during a step F8, in the table T with information which, from the point of view of the intermediate equipment E, identifies the IPsec tunnel and no longer identifies the encrypted data stream G1.

On reception of this data packet $m_2$ the interface equipment E may, in one particular embodiment of the invention, replace the management parameter value Param2 included in the header of the data packets sent by the equipment $T_2$ with the management parameter value Param1 used in the network R1. The interface equipment E then sends a second data packet $m_2'$ of the IPsec tunnel in which the management parameter value is Param1 and no longer Param2. The value of the parameter ECN remains unchanged and is still 1. In one particular embodiment of the invention, the interface equipment E may replace the value of the parameter ECN with a default value.

In another particular embodiment of the invention, the management parameter value Param2 included in the header of the data packets sent by the equipment $T_2$ may be replaced with a new management parameter value Param3. This management parameter value Param3 is stored in the table T of the interface equipment E. In this embodiment the value of the parameter ECN remains unchanged and is 1.

The data packet $m_2$, $m_2'$ is then sent to the terminal $T_1$ during a step F9.

When the interface equipment E has been configured, data packets $M_3$ of the encrypted data stream G1 and encapsulated in a data packet $m_3$ of the IPsec tunnel including in the header the management parameter value Param2 and the parameter ECN are sent by the terminal $T_1$ during a step F10. The data packets $m_3$ are intercepted by the interface equipment E during a step F11.

During a step F12, the interface equipment E identifies the IPsec tunnel via which the data packets $m_3$ are sent by means of the identification information contained in the table T. Using this information, it determines during a step F13 the management parameter value to be applied to the data packets $m_3$. When the management parameter value to be applied has been determined, the interface equipment E, during a step F14, replaces the management parameter value included in the header of the data packets $m_3$, namely Param1, with the management parameter value stored when configuring the interface equipment E, namely Param2.

Then, during a step F15, the interface equipment E sends data packets $m_3'$ to the equipment $T_2$. Such data packets $m_3'$ include in the header a management parameter value Param2. Thus, during processing by the interface equipment E, the data packets sent by the terminal $T_1$ inherit the management parameter value Param2 determined by the manager of the network R2.

A user wishing to obtain the benefit of a second service on the terminal $T_1$, needing to be sent via the same IPsec tunnel, must set up an encrypted stream G2 with the equipment $T_2$ of the network R2 providing the requested service.

Then, during a step F16, the terminal $T_1$ sends the interface equipment E a first data packet $N_1$ of the encrypted data stream G2. This data packet $N_1$ includes a management parameter value Param10 and a parameter ECN, the value of which is 0, to be applied to all the data packets of the data stream G2 sent by the terminal $T_1$ to the equipment $T_2$ via the IPsec tunnel. This data packet $N_1$ is encapsulated in a data packet $n_1$ of the IPsec tunnel including in the header the management parameter value Param10 and the parameter ECN.

On reception of this data packet $n_1$, during a step F17, the interface equipment E may, in one particular embodiment of the invention, replace the management parameter value Param10 included in the header of the data packets $n_1$ sent by the terminal $T_1$ with a predetermined management parameter value ParamBE. In this embodiment, the value of the parameter ECN remains unchanged and is still 0.

Then, during a step F18, the interface equipment E sends a second data packet $n_1'$ of the IPsec tunnel in which the management parameter value is ParamBE and no longer Param10.

On reception of this data packet $n_1'$ during a step F19 the equipment $T_2$ sends the terminal $T_1$ a third data packet $N_2$ of the encrypted data stream G2 during a step F20. This data packet $N_2$ includes a management parameter value Param20 and a parameter ECN, the value of which is 2, for example, to be applied to all the data packets of the data stream G2 sent by the terminal $T_1$ to the equipment $T_2$ via the IPsec tunnel. This data packet $N_2$ is encapsulated in a data packet $n_2$ of the IPsec tunnel and including in the header the management parameter value Param20 and the parameter ECN.

The value of the parameter ECN of the data packets of the IPsec tunnel associated with the data stream G2 is different from the value of the parameter ECN of the data packets of the IPsec tunnel associated with the data stream G1 because it distinguishes between the two data streams transmitted via the same IPsec tunnel in the intermediate equipment E.

On reception of this data packet $n_2$ the interface equipment E identifies, during a step F21, the IPsec tunnel via which the data packet $n_2$ is sent from the identification information already included in the table T, namely the IP address of the terminal $T_1$, the source UDP port, and the destination UDP port. If the intermediate equipment E identifies the IPsec tunnel in its table T, it then, during a step F22, compares the value of the parameter ECN stored in the table T to the value of the parameter ECN included in the data packet $n_2$.

If the two values of the parameter ECN are identical, that means that the table T must be updated. During a step F23 the intermediate equipment E deletes from the table T the management parameter value and the value of the parameter ECN stored in the table T and replaces them with the management parameter value and the value of the parameter ECN contained in the data packet $n_2$ during a step F24. The information comprising the IP address of the terminal $T_1$, the source UDP port, the destination UDP port, the parameter ECN and the management parameter value stored in this way corresponds to a particular data stream and thus to a particular service for which the management parameter values have been modified.

If the two values of the parameter ECN are different, that means that a new entry must be created in the table T, during a step F25, because the data packet received concerns a different data stream and thus a different service to that for which an entry has already been created in the table T. The table T then contains two distinct entries: a first entry corresponding to a first encrypted data stream G1 sent via the IPsec tunnel identified by a first set of information comprising the IP address of the terminal $T_1$, the source UDP port, the destination UDP port, a first parameter ECN the value of which is 1, for example, and a first management parameter value Param2, and a second entry corresponding to a second encrypted data stream G2 also sent via the IPsec tunnel identified by a second set of information including the IP address of the terminal $T_1$, the source UDP port, the destination UDP port, a second parameter ECN the value of which is 2, for example, and a second management parameter value Param20.

On reception of this data packet $n_2$ the interface equipment E may, in one particular embodiment of the invention, replace the management parameter value Param20 included in a header of the data packets sent by the equipment $T_2$ with the management parameter value Param10 used in the network R1. The interface equipment E then sends a second data packet $n_2'$ of the encrypted data stream G1 in which the management parameter value is Param10 and no longer Param20. The value of the parameter ECN remains unchanged and is still 2. In one particular embodiment of the invention, the interface equipment E may replace the value of the parameter ECN with a default value.

In another particular embodiment of the invention, the management parameter value Param20 included in the header of the data packets sent by the equipment $T_2$ may be replaced by a new management parameter value Param30. This management parameter value Param30 is stored in the table T of the interface equipment E. In this embodiment the value of the parameter ECN remains unchanged and is still 2.

The data packet $n_2$, $n_2'$ is then sent to the terminal $T_1$ during a step F26.

When the interface equipment E has been configured, data packets $N_3$ of the encrypted data stream G2 encapsulated in a data packet $n_3$ of the IPsec tunnel and including in the header the management parameter value Param20 and the parameter ECN are sent by the terminal $T_1$ during a step F27. The data packets $n_3$ are intercepted by the interface equipment E.

During a step F28, the interface equipment E identifies the IPsec tunnel via which the data packets $n_3$ are sent and the encrypted service stream G1, G2 to which they belong by means of the identification information contained in the table T and in particular the value of the parameter ECN in the field ECN of the headers of the data packets relating to each data stream. The value of the parameter ECN is reliable even though the data stream is sent by the terminal $T_1$ because the stream is sent via an IPsec tunnel and therefore conforms to rules specific to the IPsec technology.

Using this information, it determines during a step F29 the data stream to which the intercepted data packet belongs and consequently the management parameter value to be applied to the data packets $n_3$, namely Param2 or Param20. When the management parameter value to be applied has been determined, the interface equipment E replaces, during a step F30, the management parameter value included in the header of the data packets $n_3$ with the management parameter value stored when configuring the interface equipment E.

Then, during a step F31, the interface equipment E sends data packets $n_3'$ to the equipment $T_2$. These data packets $n_3'$ include in the header a management parameter value Param2 or Param20. Thus during processing by the interface equipment E the data packets sent by the terminal $T_1$ inherit the management parameter value Param2 or Param20 determined by the manager of the network R2 even though they are sent via an IPsec tunnel.

Figure 5:
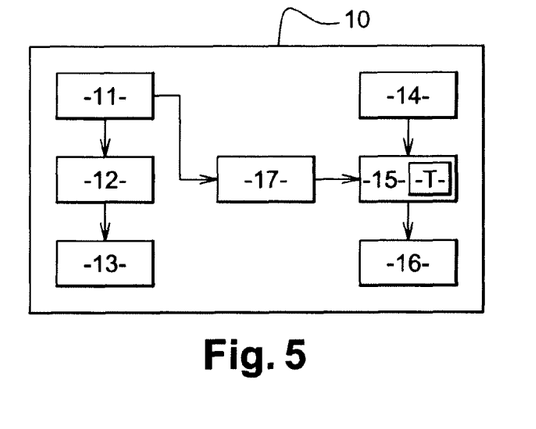
FIG. 5 represents a device adapted to use the configuration method of an embodiment of the invention.

A device able to use the method of an embodiment of the invention is shown in FIG. 5. This device 10 is disposed at the interface between a first network R1 and a second network R2.

The device 10 includes means 11 for receiving data packets of a data stream coming from the network R1.

The receiver means 11 are connected to the input of means 12 for replacing with a predetermined parameter the management parameter value to be applied to the data packets sent by the terminal $T_1$ of the network R1.

The replacement means 12 are connected to the input of means 13 for sending the network R2 data packets of the data stream.

The device 10 also includes means 14 for receiving data packets of the data stream coming from the network R2. These storage means 15 may include a table T in which the management parameter value is stored.

These receiver means 14 are connected to the input of means 15 for storing the management parameter value to be applied to the data packets of a data stream S1 exchanged between the terminal $T_1$ and the equipment $T_2$ of the network R2.

These storage means 15 are connected to the input of means 16 for sending data packets to the network R1.

The device 10 finally includes means 17 for identifying the data stream to which data packets belong. The identification means 17 are connected to the output of the receiver means 11 and to the input of the sending means 16. These identification means 17 make it possible to determine the management parameter value to be applied to the data packets being processed.

A device 10 of an embodiment of the invention may be disposed in an equipment providing an interface between two distinct communications networks such as a home or business gateway, a Digital Subscriber Line Multiplexer (DSLAM), a router, an Optical Line Termination (OLT) or a Multi-Service Access Node (MSAN).

Finally, an embodiment of the invention also provides a computer program, notably a computer program on or in an information medium or memory, adapted to implement an embodiment of the invention. This program may use any programming language and take the form of source code, object code or a code intermediate between source code and object code, such as a partially-compiled form, or any other form desired for implementing an embodiment of the invention.

The information medium may be any non-transitory entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed via an electrical or optical cable, by radio or by other means. The program of an embodiment of the invention may in particular be downloaded over a network of the Internet type.

Although the present disclosure has been described with reference to one or more examples, workers skilled in the art will recognize that changes may be made in form and detail without departing from the scope of the disclosure and/or the appended claims.

The invention claimed is:

1. A method of configuring management parameter values of data messages of a first data stream, the method including:
   a first step of sending from a first communications network to a second communications network a first message of the first data stream including a first data message management parameter value; and a second step of sending from the second network to the first network a second message of the first data stream including a second data message management parameter value;

a step of selecting from the first and second management parameter values a management parameter value to be applied to all the data messages of the first data stream, with said step of selecting being implemented by a communications equipment that provides an interface between the first and second communications networks; and during transmission, between the first and second communications networks of another data stream having a same stream identifier as the first data stream:

a step of comparing a value of a parameter, called a parameter ECN, included in a header field of data messages of the other data stream with a value of the parameter ECN included in a header field of the data messages of the first data stream; and when the values of the parameters ECN are different, a step of storing the identifier of the other data stream in association with the value of the parameter ECN included in a header field of the data messages of the other data stream and a selected management parameter value for the other data stream.

2. The method according to claim 1, wherein the first and second management parameter values are contained in a header field of the data messages of the first data stream.

3. The method according to claim 1, wherein, before the step of selecting the management parameter value to be applied, a predetermined management parameter value is applied to the data messages of the first data stream.

4. A device for configuring management parameter values of data messages of a first data stream, the device including:

first means for sending from a first communications network to a second communications network a first message of the first data stream including a first data message management parameter value;

second means for sending from the second network to the first network a second message of the first data stream including a second data message management parameter value;

means for selecting from the first and second management parameter values a management parameter value to be applied to all the data messages of the first data stream; and means for performing the following steps during transmission, between the first and second communications networks of another data stream having a same stream identifier as the first data stream:

comparing a value of a parameter, called a parameter ECN, included in a header field of data messages of the other data stream with a value of the parameter ECN included in a header field of the data messages of the first data stream; and when the values of the parameters ECN are different, storing the identifier of the other data stream in association with the value of the parameter ECN included in a header field of the data messages of the other data stream and a selected management parameter value for the other data stream.

5. Equipment providing an interface between first and second communications networks, wherein the equipment comprises a device for configuring management parameter values of transmitted data messages of a first data stream, including:

first means for sending from a first communications network to a second communications network a first message of the first data stream including a first data message management parameter value;

second means for sending from the second network to the first network a second message of the first data stream including a second data message management parameter value;

means for selecting from the first and second management parameter value a management parameter value to be applied to all the data messages of the first data stream; and means for performing the following steps during transmission, between the first and second communications networks of another data stream having a same stream identifier as the first data stream:

comparing a value of a parameter, called a parameter ECN, included in a header field of data messages of the other data stream with a value of the parameter ECN included in a header field of the data messages of the first data stream; and when the values of the parameters ECN are different, storing the identifier of the other data stream in association with the value of the parameter ECN included in a header field of the data messages of the other data stream and a selected management parameter value for the other data stream.

6. A non-transitory storage medium comprising a computer program stored thereon, wherein the computer program includes program code instructions for executing a method of configuring management parameter values of data messages of a first data stream, when the program is executed by a processor, wherein the method comprises:

a first step of sending from a first communications network to a second communications network a first message of the first data stream including a first data message management parameter value; and a second step of sending from the second network to the first network a second message of the first data stream including a second data message management parameter value; and a step of selecting from the first and second management parameter values a management parameter value to be applied to all the data messages of the first data stream, with said step of selecting being implemented by a communications equipment that provides an interface between the first and second communications networks; and during transmission, between the first and second communications networks of another data stream having a same stream identifier as the first data stream:

a step of comparing a value of a parameter, called a parameter ECN, included in a header field of data messages of the other data stream with a value of the parameter ECN included in a header field of the data messages of the first data stream; and when the values of the parameters ECN are different, a step of storing the identifier of the other data stream in association with the value of the parameter ECN included in a header field of the data messages of the other data stream and a selected management parameter value for the other data stream.

* * * * *

UNITED STATES PATENT AND TRADEMARK OFFICE
CERTIFICATE OF CORRECTION

PATENT NO. : 8,793,395 B2  
APPLICATION NO. : 13/125714  
DATED : July 29, 2014  
INVENTOR(S) : Jean-Francois Cadiou et al.

Page 1 of 1

It is certified that error appears in the above-identified patent and that said Letters Patent is hereby corrected as shown below:

In the Claims

Claim 6, column 16, line 39, delete "and".

Claim 6, column 16, line 43, delete "and".

Signed and Sealed this  
Twenty-second Day of September, 2015

Michelle K. Lee  
*Director of the United States Patent and Trademark Office*